(No Model.)
C. D. MORIN.
ROLLER DEVICE FOR SEAMS OF TIN ROOFS.
No. 250,946. Patented Dec. 13, 1881.
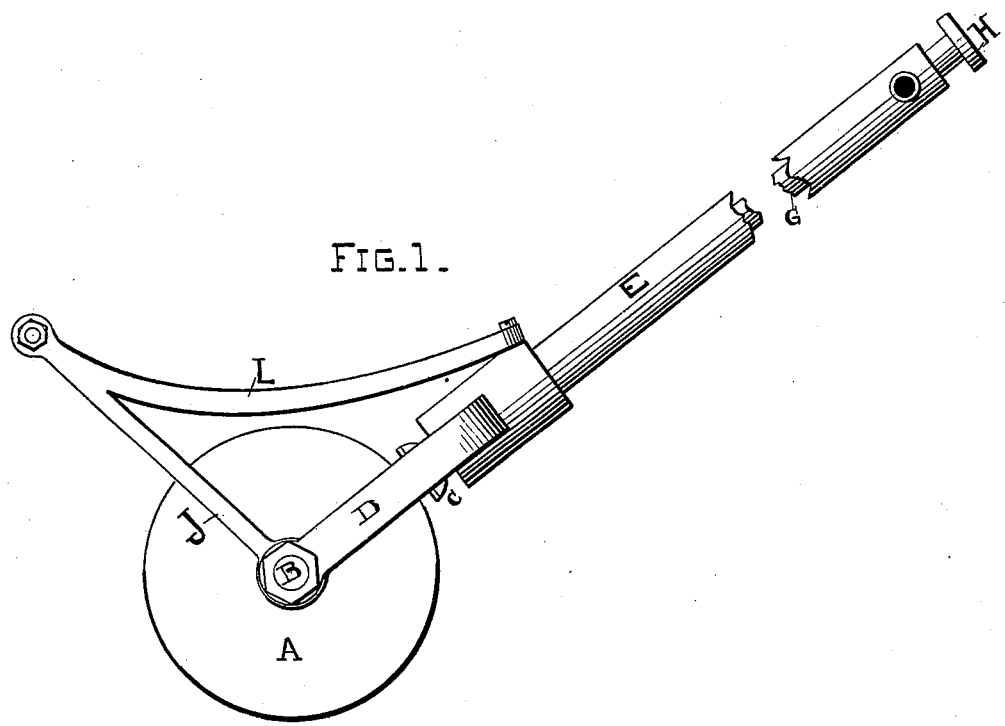
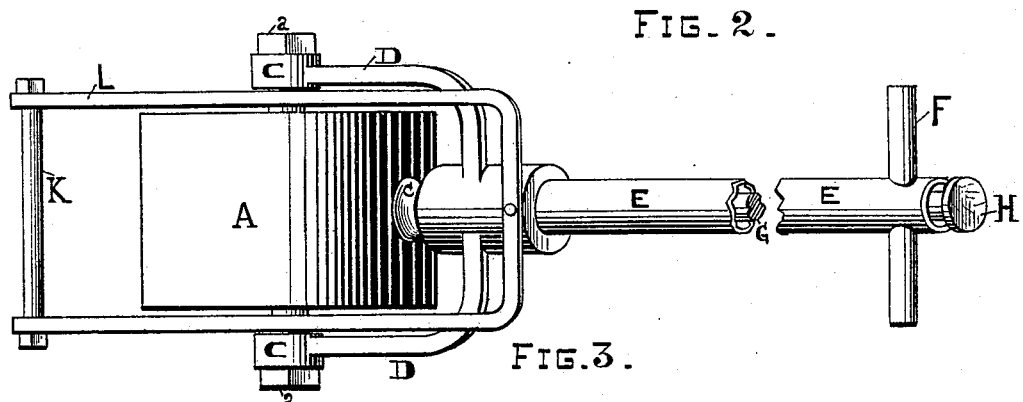
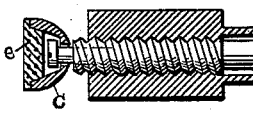
WITNESSES
INVENTOR.

UNITED STATES PATENT OFFICE.

CHARLES D. MORIN, OF WOODLAND, CALIFORNIA.

ROLLER DEVICE FOR SEAMS OF TIN ROOFS.

SPECIFICATION forming part of Letters Patent No. 250,946, dated December 13, 1881.

Application filed April 30, 1881. (No model.)

*To all whom it may concern:*

Be it known that I, CHARLES D. MORIN, of Woodland, county of Yolo, State of California, have invented a Roller Device for Seams of Tin Roofs; and I hereby declare the following to be a full, clear, and exact description thereof.

My invention relates to a machine or roller device for rolling and flattening out the seams on tin roofs of houses.

It consists in a heavy roller, journaled in a frame having a handle, in combination with a brake for said roller.

It further consists in an upper or supplementary frame, on which additional weight may be placed when necessary.

The object of my invention is to provide a device which will save labor and flatten out the seams regularly and evenly, thus preparing them for the better reception of the solder. It therefore has application merely to such seams as require to be flattened, and is not for the purpose of making and rolling upright seams on tin roofs.

Referring to the accompanying drawings, Figure 1 is a side elevation of the machine. Fig. 2 is a plan view. Fig. 3 is a section through the lower end of the hollow handle.

Let A represent a heavy metal roller, having a shaft, B, projecting on each side, the ends of which are loosely fitted or journaled in the holding pieces or sockets C, and secured by nuts *a*, as shown. To these pieces are bolted the forks D, projecting rearwardly and meeting in an extended handle, E, the end of which has a cross-piece or handle, F. The roller A is placed upon the seam and rolled along over it. Its weight is sufficient to flatten out the seam, and it will do this regularly and evenly. The solder will flow freely when put into the seams, and less will be required than if the seams were irregular. The long handle will permit it to be operated with convenience, and to reach comparatively inaccessible places. If a longer handle is needed, it can be easily bolted in the socket-piece C. In its operation upon slightly-slanting roofs, in order to prevent the roller from acquiring too great momentum, I have applied a brake. The handle E is hollow, generally made of gas-pipe. Its lower end will be provided with a few screw-threads, as shown. Through the handle passes the rod G, having corresponding screw-threads upon its lower end, and a thumb-piece, H. Its lower end projects through the handle and is provided with a knob or brake, *c*, fitted with a suitable washer, *e*, which impinges upon the surface of the roller A. By turning the thumb-piece H the knob *c* is pressed against the roller or removed therefrom. It may happen that the weight of the roller alone will be insufficient for a particular piece of work. In order to increase its weight at pleasure I have provided a supplementary frame as follows: Loosely fitting the shaft B between the sides of the roller and the socket-pieces C are the standards J, having a cross-head, K. From their tops, extending rearwardly, are the side pieces, L, joined behind, as shown, and screwed down to the handle E. The side pieces, L, are concaved, as shown. Upon the frame thus formed any necessary additional weight may be placed and carried. This frame can be readily removed when desired.

I am aware that devices for rolling upright seams of tin roofs are not new, and that in connection with machines for lapping over the edges and making the upright seams on slanting roofs, there are rollers which smooth out the seams. I do not therefore claim a rolling device, broadly.

What I do claim as new, and desire to secure by Letters Patent, is—

1. In combination with the roller A, the hollow handle E, fork D, and brake-rod G, with its brake *c*, when arranged and used substantially as herein set forth.

2. The combination of the roller A, journaled in the forked end of the handle E, and the weight-supporting frame, consisting of the standards J and concaved side pieces, L, when arranged as used, substantially as herein described.

In witness whereof I have hereunto set my hand.

CHARLES DOMINIC MORIN.

Witnesses:
   A. C. RUGGLES,
   T. MUEGGE.